Oct. 6, 1925. Re. 16,180

A. W. CHAPMAN ET AL

MOVABLE SEAT FOR VEHICLES AND THE LIKE

Original Filed Aug. 7, 1922 2 Sheets-Sheet 1

INVENTORS:
Arthur W. Chapman
Frank G. L. Biddlecombe
BY
Charles H. Kesler
Their ATTORNEY Oct. 6, 1925. Re. 16,180

A. W. CHAPMAN ET AL

MOVABLE SEAT FOR VEHICLES AND THE LIKE

Original Filed Aug. 7, 1922 2 Sheets-Sheet 2

INVENTOR
Arthur W. Chapman
Frank G. L. Biddlecombe
BY
Charles H. Kesler
Their ATTORNEY Reissued Oct. 6, 1925.

Re. 16,180

UNITED STATES PATENT OFFICE.

ARTHUR WILLIAM CHAPMAN AND FRANK GUY LANG BIDDLECOMBE, OF LONDON, ENGLAND.

MOVABLE SEAT FOR VEHICLES AND THE LIKE.

Original No. 1,444,660, dated February 6, 1923, Serial No. 580,295, filed August 7, 1922. Application for reissue filed January 20, 1925. Serial No. 3,704.

*To all whom it may concern:*

Be it known that we, ARTHUR WILLIAM CHAPMAN and FRANK GUY LANG BIDDLECOMBE, subjects of the King of Great Britain, both of Ranelagh Gardens, Hurlingham, London, S. W. 6, England, have invented a Movable Seat for Vehicles and the like, of which the following is a specification.

This invention relates to improvements in means for shifting or moving seats; and the same has for its object more particularly to provide a simple, reliable and efficient device which facilitates the movement of said seat from one position to another when said seat is actuated.

Further, said invention has for its object to provide a seat of the character specified, which is adapted to be directly disposed upon the floor of a motor-car, boat, airplane, or the like, to firmly rest thereon, and which is readily shifted or moved out of the way to provide a passage for persons entering and leaving said vehicle, or the like.

Further, said invention has for its object to provide a seat of the character specified, which is shifted or moved bodily over said floor from one position to the other without being unduly opposed or retarded by frictional forces.

Further, said invention has for its object to provide a seat of the character specified, which is moved or shifted bodily from one position to the other by giving the same a slight push requiring very little exertion on the part of the operator.

Further, said invention has for its object to provide a seat of the character specified, which must be initially tilted by the operator to cause movement of said seat bodily from one position into the opposite position.

Further, said invention has for its object to provide a seat of the character specified in which the supporting edges of the seat when the same is in operative position and the pivotal connection of said rigid connecting member to the floor lie in substantially the same horizontal plane in close proximity to or coincident with said floor, and in which the pivotal connection of said member to the seat is disposed closely adjacent to said supporting edges in position to cause said rigid member to hold said seat against longitudinal movement until the same is tilted.

Further, said invention has for its object to provide a seat of the character specified, which is automatically locked against vertical or tilting movement when the same is moved to the operative or sitting position.

Further, said invention has for its object to provide a seat of the character specified in which a rigid member is pivotally connected to said seat and said floor to facilitate the movement of said seat bodily from one position to another, and in which said member is disposed beneath said seat in one of the positions thereof to permit of the tilting of said seat to a substantially vertical position about the pivotal connection of said seat with said member, whereby to render the parts, normally obstructed by said seat, accessible.

Further, said invention has for its object to provide a seat of the character specified in which the seat shifting means may be secured to the seat in one position to cause the front of the seat to tilt in one direction when the same is actuated, or may be secured thereto in the reverse position to cause said front to tilt in the opposite direction when said seat is actuated, whereby said means may be installed in one position or the other, depending on the position of the parts of the car which face the occupant of said seat.

Other objects will in part be obvious and in part be pointed out hereinafter.

To the attainment of the aforesaid objects and ends our invention consists in the novel details of construction, and in the combination, connection and arrangement of parts hereinafter more fully described and then pointed out in the claims.

In the accompanying drawings showing an illustrative embodiment of the invention—

Figure 2:
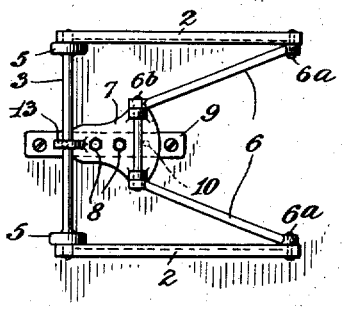
Fig. 2 is a plan of the seat supporting device or attachment disposed in the position shown in full lines in Fig. 1.
Figure 3:
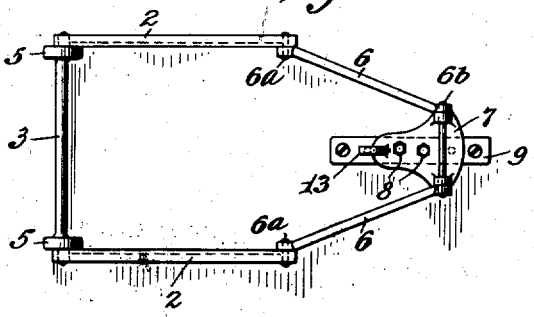
Fig. 3 is a plan of said device disposed in the position shown in broken lines in Fig. 1.
Figure 4:
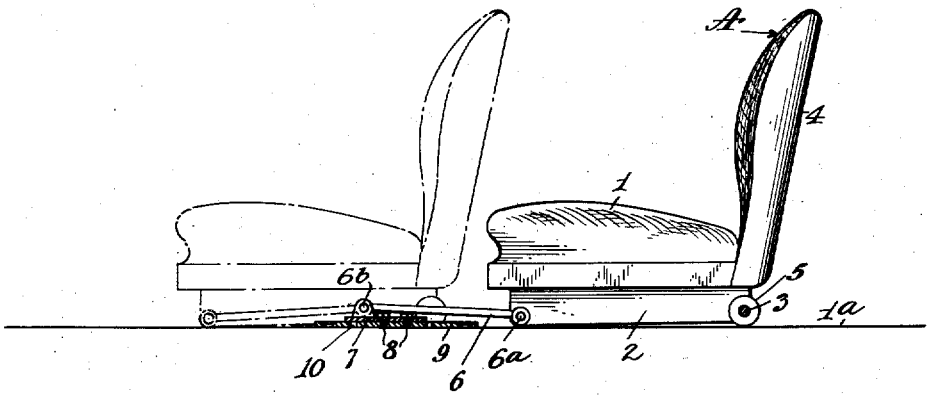
Figure 5:
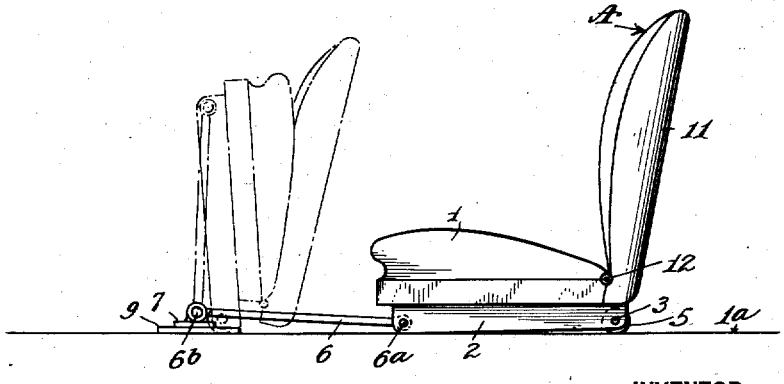

Fig. 4 is a side elevation, illustrating the form shown in Figs. 2 and 3 applied to the seat in the reverse manner, the seat being illustrated in full lines in its normal or "sitting" position, and in broken lines in its opposite or inoperative position; and Fig. 5 is a side elevation of a modified form of seat in which the same is folded vertically as shown in broken lines when moved to the inoperative position.

Referring to the drawings (Figs. 1 to 4), the upholstered body 1 of the seat is rigidly attached to or mounted upon the parallel frame members 2 which serve to support the seat 1 directly upon the floor or surface $1^a$ in each of its positions, the said frame members 2 having straight lower edges which engage said floor or surface $1^a$ when the seat is in either of its two positions to provide a firm support for said seat during the travel of the vehicle.

Associated with one extremity or end of the frame members 2 is means serving to reduce friction during the travel of said seat over said surface $1^a$, and serving as an axis about which said seat is tilted when the same is actuated to move the same from either position to the other, said end or extremity engaging said surface continuously throughout the travel of said seat from either position to the other position. This means is illustrated as an axle 3 having small wheels or rollers 5 thereon, although castors runners, slides, or other suitable anti-friction devices may be employed. A rigid seat shifting member comprising diverging arms 6, is pivoted at the outer diverging ends $6^a$ of said arms 6 to the inner sides of the members 2 at the end or extremity thereof which is opposite the rollers 5, said arms 6 being adapted to swing between said members 2 about a horizontal axis. The opposite end $6^b$ of said arms 6 is pivoted to a plate 7 secured by bolts 8 to a plate 9, which is in turn secured to the floor $1^x$. The plate 9 preferably has a series of holes 10 therein to receive the bolts 8 so that the plate 7 may be secured to the plate 9 in different longitudinal positions to permit of the adjustment of the device to properly locate the seat relative to the other parts of the vehicle or place in which the seat is installed.

The distance between the pivots $6^a$ and $6^b$ does not exceed, and is preferably less than the distance between the pivot $6^a$ and axle 3, so that when the end $6^a$ of the seat is lifted the rollers 5 will remain in engagement with the floor $1^a$ throughout the entire travel of the seat, providing a bearing support for the seat offering very little resistance to the movement thereof.

The arms 6 are illustrated in Figs. 1 to 4 as being shorter than the members 2 and in Fig. 5 as being of substantially the same length as said members.

The pivotal connection $6^b$ and the lower edges of the members 2 which rest on the floor $1^a$ when the same are in the operative positions (Figs. 1 to 5), and when the same are in the inoperative positions (Figs. 1 to 4), lie substantially in the same horizontal plane in close proximity to or coincident with the said floor. The pivot $6^a$ likewise lies closely adjacent to the lower edges of said members 2 in position to cause said member 6 to hold said seat against longitudinal movement due to inertia or other longitudinally acting forces. The pivots $6^a$ and $6^b$ may be disposed in substantially horizontal alinement, as illustrated, when the seat is in the aforesaid positions or in such relative positions as to necessitate that said seat be tilted to cause the same to move bodily.

The arrangement is such as to permit of the member 6 folding beneath the seat in certain of the positions thereof to provide a compact attachment which is not in the way.

Figure 1:
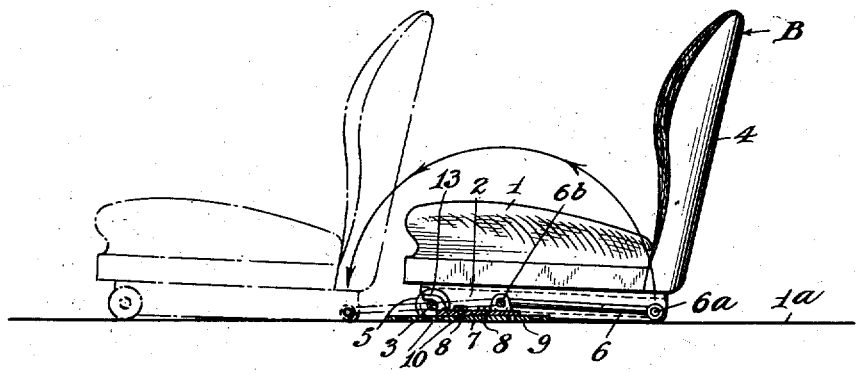
Figure 1 is a side elevation with parts omitted and with parts in section of one form of seat constructed according to and embodying the invention, the seat being illustrated in full lines in its normal or "sitting" position, and in broken lines in its opposite or inoperative position.

In operation, the seat shifting means may be secured to the seat, either as shown in Fig. 1, or as shown in Fig. 4. The arrangement shown in Fig. 1 is advantageous when the facia board or part of the motor car in front of the driver or passenger is low, it being then desirable to impart a downward tilting movement to the front of the seat when actuating it. The arrangement shown in Fig. 4 may be employed when the facia board is high enough to clear the upwardly tilting front edge of the seat upon the actuation thereof. When it is desired to actuate the seat (Fig. 1) to move the same forwardly out of the way, the rear of the back 4 of the seat is given a slight push applied at the point B, which affords considerable leverage.

The seat thereupon tilts about the rollers 5 as an axis moving the pivot $6^a$ vertically. Owing to the connection of the arm 6 to the seat, the tilting movement resolves into a combined tilting and longitudinal movement which causes the pivot $6^a$ to swing over the pivot $6^b$, moving the seat bodily into its forward or inoperative position, as illustrated in broken lines, Fig. 1. The seat is returned to its operative or "sitting" position by applying an initial tilting pressure on the back 4 at the point B.

When the seat (Figs. 1 to 4) is moved forwardly and backwardly between the two positions thereof, one edge or extremity, i. e., the extremity on which the seat rests, travels in a straight line in continuous engagement with the floor and the opposite edge or extremity describes an arc of substantially 180 degrees.

When the tilting attachment is secured to the seat with the rollers 5 at the rear, and the pivot 6ª at the front as shown in Fig. 4, the same may be actuated to move the same into inoperative position, shown in broken lines, by applying pressure to the front of the back 4 at the point A. This causes the seat to tilt about the rollers 5 and move forwardly into its opposite position in the manner above described. The operation is the same in both cases, except that in the arrangement of Fig. 4, the front of the seat tilts upwardly instead of downwardly, as in the arrangement of Fig. 1. The seat is returned by applying pressure at A.

It is necessary to tilt the seat to cause the same to move bodily longitudinally. This tilting movement instantly reduces to a minimum the bearing surface in contact with the floor and renders the frictional forces opposing the longitudinal movement negligible.

When the seat is in the operative or "sitting" position shown in Fig. 1, the same tends to tilt backwards around the pivot 6ª as an axis. To prevent this when the seat is in use a catch or hook 13 secured to the floor is provided, which automatically engages over the axle 3 when the same moves into its rearmost position. Because of the construction and arrangement of parts above described, the whole seat when the arms 6 are disposed beneath the seat may be tilted about the pivot 6ª as an axis into a substantially vertical position by first moving the seat slightly to disengage the catch 13, and then by swinging the seat upwardly about said axis 6ª. When the seat is swung vertically access may be had to the parts normally obstructed thereby for the purpose of cleaning and repairing said parts.

In Fig. 5 is shown a form of the invention which may be employed on cars having a central lever control at the front, which in some cases prevents the use of the arrangements of Figs. 1 to 4. The arrangement of Fig. 5 is like that of Fig. 4 except that in the former, the arm 6 is longer. The back 11 is hinged at 12 to permit of the folding thereof over the seat 1. To move this seat forwardly to inoperative position, pressure is applied at A to the front of the back 11, which tilts the seat about the extremity 5, the seat thereupon moving forwardly into a substantially vertical position, as shown in broken lines, with the back 11 folded upwardly against the seat. The principle of operation here is the same as in the other construction, except owing to the use of a longer arm 6 the forward end of the seat describes an arc of only 90 degrees instead of an arc of approximately 180 degrees. The link or arm 6 of Fig. 5 not only serves to direct the seat in its movements from one position to the other, but also facilitates the movement by causing the seat to travel longitudinally when the same is tilted as above described.

Our said invention although of general application is particularly adapted for use in closed motor-cars of the sedan type where it is necessary to move the front seat forwardly before passengers can enter and leave the car.

Having thus described our said invention what we claim and desire to secure by Letters Patent is:—

1. A vehicle or other seat including a base member therefor adapted to rest upon a support in an operative position and to be moved bodily upon said support to another position thereon, and a member pivotally connected at one end to one extremity of said base member and at its opposite end to said support on which said base member is adapted to travel; said pivoted member, when said seat is at rest in said operative position, extending substantially horizontally to maintain said seat in said operative position against movement bodily horizontally relative to said support, and, when said seat is in either of said positions, serving to facilitate the movement of said seat to the other of said positions when the seat is tilted; and the opposite extremity of said base member constituting an axis about which said seat is tiltable to permit of the movement thereof from each of said positions to the other, and by which said support is continuously engaged during the movement of said seat back and forth between said positions.

2. A vehicle or other seat including a base member therefor adapted to rest upon a support in an operative position and to be moved bodily upon said support to another position thereon, a member pivotally connected at one end to one extremity of said base member and at its opposite end to said support on which said base member is adapted to travel; said pivoted member, when said seat is at rest in operative position, extending substantially horizontally, and, when said seat is in either of said positions, serving to facilitate the movement of said seat to the other of said positions when the seat is tilted; the opposite extremity of said base member constituting an axis about which said seat is tiltable to permit of the movement thereof from each of said positions to the other, and by which said support is continuously engaged during the movement of said seat back and forth between said positions, and means serving to permit of the connection of said pivoted member to said support at any of a plurality of points longitudinally thereof whereby to vary the operative position of said seat on said support.

3. A vehicle or other seat including a base member therefor adapted to rest upon a support in an operative position and to be moved bodily upon said support to another position thereon, a member pivotally connected at one end to one extremity of said base member and at its opposite end to said support; said pivoted member, when said seat is at rest in operative position, extending substantially horizontally to maintain the seat against movement bodily horizontally relative to said support, and, when said seat is in either of said positions, serving to facilitate the movement of said seat to the other of said positions when the seat is tilted; and the opposite extremity of said base member constituting an axis about which said seat is tiltable to permit of the movement thereof from each of said positions to the other, and by which said support is continuously engaged during the movement of said seat back and forth between said positions, and a locking member on said support in the path of travel of said seat serving to engage said base member to hold the seat to said support when the same is moved to operative position.

4. A vehicle or other seat including a base member therefor having side portions adapted to rest upon a support in an operative position and to be moved bodily upon said support to another position thereon, a member pivotally connected at one end below said seat at one extremity of said base member between said side portions thereof, and at its opposite end to said support on a level with said side portions; said pivoted member, when said seat is in certain of said positions, extending beneath said seat between said side portions, and, when said seat is in either of said positions, serving to facilitate the movement of said seat to the other of said positions, and anti-friction devices at the opposite extremity of said base member constituting an axis about which said seat is tiltable to permit of the movement thereof from each of said positions to the other, and by which said support is continuously engaged during the movement of said seat back and forth between said positions.

5. A vehicle or other seat including a low base member providing a seat having a relatively low center of gravity and adapted to rest upon a support in an operative position and to be moved bodily upon said support to another position thereon, and a member pivotally connected at one end below said seat at one extremity of said base, and at its opposite end to said support on which said base member is adapted to travel; said pivoted member in certain of the positions of said seat extending substantially horizontally to maintain said seat in said operative position against movement bodily horizontally relative to said support, and in each of said positions of said seat serving to facilitate the movement of said seat to the other of said positions when the seat is tilted; said pivoted member, when the seat is in certain of said positions, being disposed beneath said seat substantially parallel therewith; and the opposite extremity of said base member constituting an axis about which said seat is tiltable to permit of the movement thereof from each of said positions to the other, and by which said support is continuously engaged during the movement of said seat back and forth between said positions.

6. A vehicle or other seat including a base member for the seat adapted to rest upon a support and to be moved bodily upon said support between spaced positions thereon, a plate, an arm pivotally connected at one end to one extremity of said base member and at its opposite end to said plate; the opposite extremity of said base member constituting an axis about which said seat is tiltable, and serving to continuously engage said support as the seat is moved between said positions, means serving to permit of the connection of said plate to said support in any of a plurality of positions longitudinally thereof, and a locking member carried by said plate, and serving to engage said base member when the seat is moved to operative position.

7. A vehicle or other seat including a base member including elongated, relatively narrow horizontally extending side portions upon which the seat is secured; said side portions being adapted to rest upon a support in an operative position and to be moved bodily upon said support to another position thereon, a member pivotally connected at one end to one extremity of said base member between said side portions thereof and at its opposite end to said support; said pivoted member, when said seat is at rest in said operative position, being disposed to maintain said seat in said operative position against movement bodily horizontally relative to said support, and when said seat is in either of said positions, serving to facilitate the movement of said seat to the other of said positions when the same is tilted; and the opposite extremity of said base member constituting an axis about which said seat is tiltable to permit of the movement thereof from each of said positions to the other, and which continuously engages said support during the movement of said seat back and forth between said positions.

Signed at London, England this 30th day of December, one thousand nine hundred and twenty-four.

ARTHUR WILLIAM CHAPMAN.
FRANK GUY LANG BIDDLECOMBE.